Patented Dec. 23, 1941

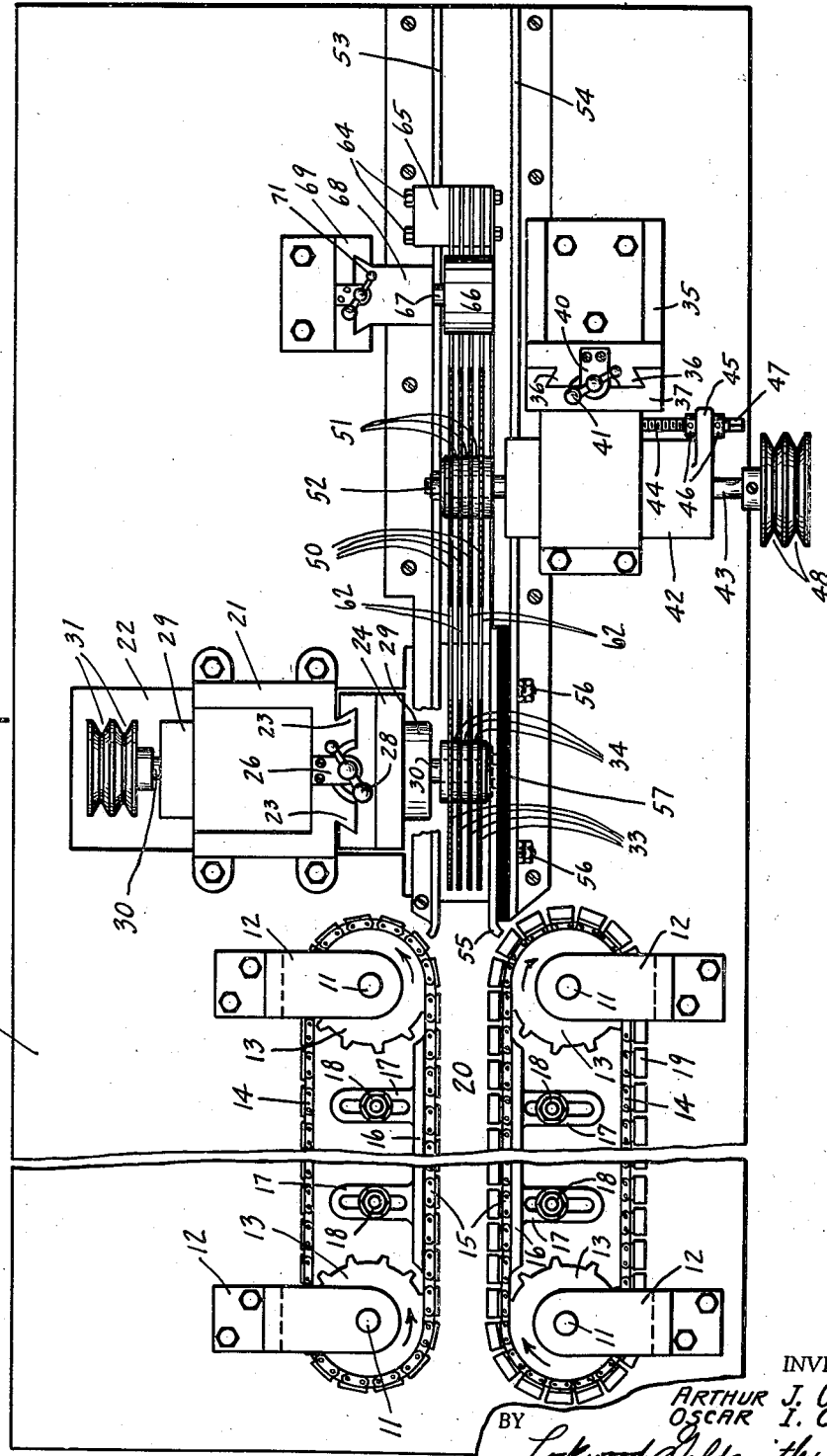

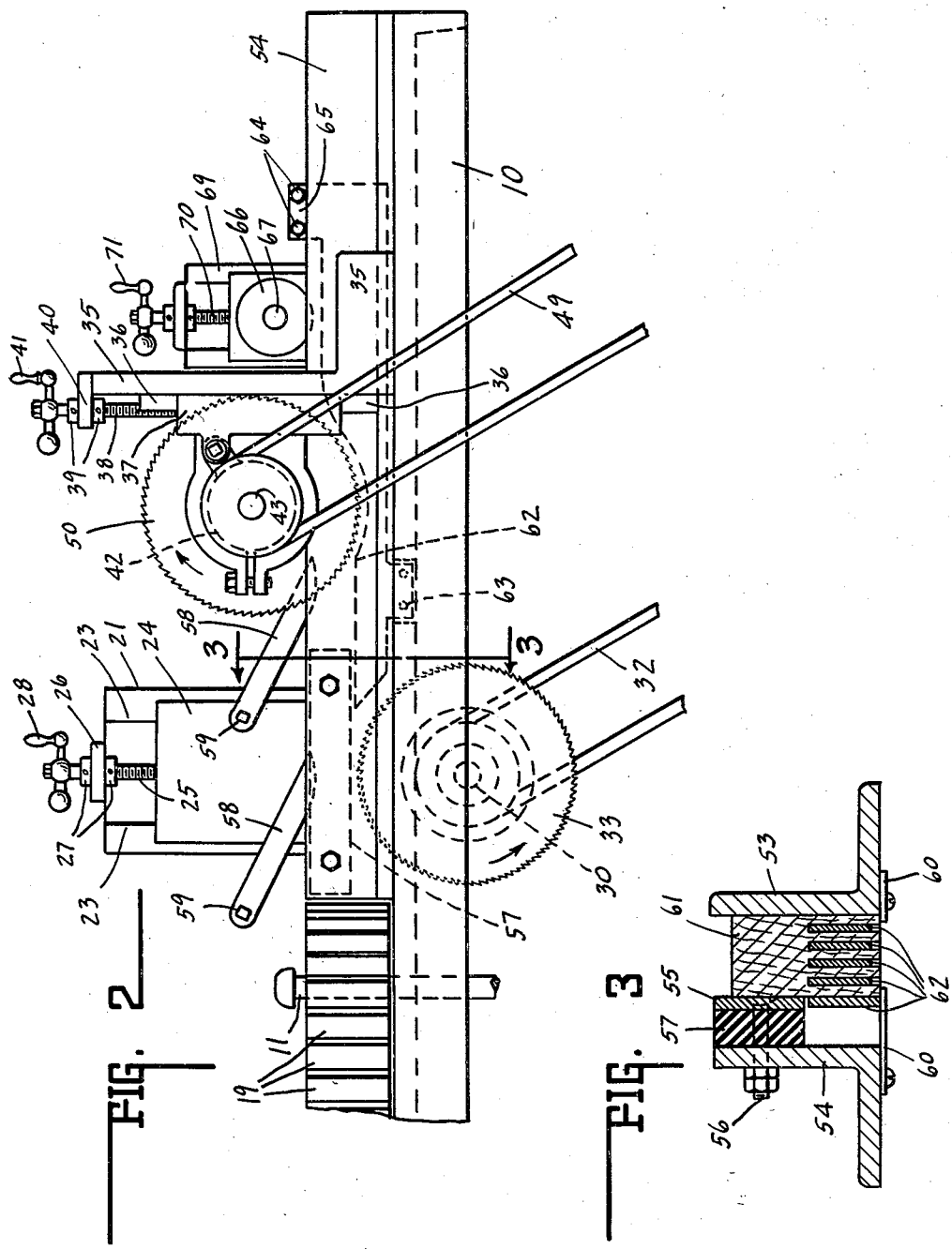

2,266,847

UNITED STATES PATENT OFFICE 2,266,847

POWER DRIVEN RIPSAW

Arthur J. Calpha and Oscar I. Craft, Brazil, Ind., assignors to Indiana Foundry Machine and Supply Company, Brazil, Ind., a corporation Application January 18, 1940, Serial No. 314,365

2 Claims. (Cl. 143—4)

This invention relates to a power driven rip saw particularly adapted to the sawing of Venetian blind slats or other relatively thin strips of wood but equally useful for other purposes.

In the production of Venetian blinds with the gang saws heretofore in use, difficulty has been encountered in obtaining slats substantially free from saw marks. The removal of such saw marks requires a planing operation which is wasteful of time and stock. The most noticeable tooth marks are formed with a rotary saw as the teeth enter and leave the work since at these points the teeth are travelling obliquely across the grain of the wood. The wider the slat to be cut the greater is the obliquity of the tooth travel with a given diameter of saw. The obliquity can, of course, be reduced by increasing the diameter of the saw but this in turn increases the difficulty of accurately spacing the blades of a gang saw because of the greater flexibility of a large diameter saw. An increase in the thickness of the saw to decrease flexibility means a wider cut and more wastage of stock.

One object of the present invention is to eliminate the production of noticeable saw tooth marks without resorting to large diameters or thicknesses of saw blades. This is accomplished by the use of a pair of gang saws operating successively one on each side of the work, the first saw cutting only partially through the work and the second saw completing the cut. By this means the saw diameters for a given obliquity of tooth travel need be only about half that of a single saw cutting completely through the work. With the smaller diameter of saw, a thinner blade may be used without difficulty of maintaining proper spacing between the blades and there is much less wastage of stock in the saw cuts. By the use of a micrometer movement for adjusting the position of at least one of the saws the two may be accurately aligned with the blades of one saw in the same planes as those of the other. Stationary splitter blades are provided to insure that the work travels accurately in a predetermined path from one saw to the other.

Other objects and features of the invention will be understood from the accompanying drawings and the following description and claims:

Fig. 1 is a plan view of a power driven rip saw constructed in accordance with the invention. Fig. 2 is a side elevational view thereof. Fig. 3 is a sectional view taken on the line 3—3 of Fig. 2.

In the preferred form of the invention shown in the drawings by way of illustration, there is provided a flat stationary work table 10 which may be suitably supported by legs, not shown, at any convenient height. A plurality of vertical shafts 11 are journaled in the work table and in brackets 12 secured to the upper surface thereof. Sprockets 13 are mounted on said shafts and carry a pair of sprocket chains 14 having parallel runs 15 extending between the pairs of sprockets. Each of the runs 15 is backed by a guide member 16 adjustably mounted on the work table 10 by means of lugs 17 and bolts 18 operating in suitable slotted openings in said lugs. One of the chains 14 is faced with blocks 19 of rubber or other suitable resilient material. The shafts 11 may be rotated by any suitable power drive such as an electric motor geared or belt-connected to said shafts. When so rotated said shafts move the chains in the direction of the arrows of Fig. 1. A piece of work from which a plurality of slats are to be cut may then be inserted at the left end of the space 20 between the runs 15 and is propelled by the chains 14 across the surface of the work table 10. The resilient facing of one of the chains provides allowance for minor variations in width of the stock, while larger variations may be taken care of by adjustment of one or both of the backing members 16.

The mounting of the first of the gang saws to operate on the work includes a frame member 21 secured to the upper surface of the work table 10 and straddling an opening 22 in said table. The frame member 21 is provided with a vertical dovetail guideway 23 on which there is slidably mounted a movable base member 24. Said base member is supported by a screw 25 threadedly engaged therewith and having an unthreaded portion passing through a bracket 26 secured to the frame member 21. Collars 27 secured to the screw 25 prevent vertical movement of said screw. A crank handle 28 is mounted on the upper end of said screw and may be used to rotate the screw to raise or lower the vertical base member 24. The base member 24 extends downwardly through the opening 22 in the table 10 and has mounted on the lower end thereof a shaft bearing 29 in which there is journaled a shaft or mandrel 30. The shaft is restrained against longitudinal movement with respect to the bearing member 29 by suitable thrust bearings within said member. The shaft 30 has mounted on one end thereof a pair of pulleys 31 which may be driven by belts 32 by an electric motor or other suitable power means.

At the opposite end the shaft 30 supports a plurality of saw blades 33 accurately spaced by collars 34 in a well known manner. The blades 33 are preferably provided with hollow ground teeth since this type of tooth produces the minimum amount of tooth mark in the wood.

The mounting for the second of the gang saws to operate on the work includes a frame member 35 secured to the upper surface of the work table 10 and provided with a vertical dovetail guideway 36. A vertically movable base member 37 is mounted on said guideway and is supported by a screw 38 threadedly engaging the same and having a pair of collars 39 secured thereto on opposite sides of a bracket 40 mounted on the frame member 35. A crank handle 41 secured to the upper end of the screw 38 is used to raise or lower the movable base 37. A shaft bearing member 42 is slidably mounted for horizontal movement in the base member 37 and has a shaft 43 journaled therein. The bearing member 42 is preferably provided internally with ball or roller bearings carrying radial and thrust loads so that the shaft 43 is constrained to move horizontally with movement of the bearing member. A micrometer screws 44 is threadedly engaged with the base member 37 and has an unthreaded portion extending through a lug 45 formed on the bearing member 42. Collars 46 prevent horizontal movement of the screw 44 with respect to the bearing member 42. The outer end 47 of the screw 44 is squared to receive a suitable tool for adjustment thereof. The shaft 43 is provided at one end with a pair of pulleys 48 which may be driven by belts 49 by an electric motor or other suitable power means. The opposite end of the shaft 43 extends over the path of travel of the work and carries a plurality of saw blades 50 accurately spaced by collars 51 and secured in place by a nut 52. By means of the micrometer screw 44 the saw blades 50 may be moved horizontally and placed in accurate alignment with the blades 33. If desired the bearing member 29 may also be provided with a micrometer adjustment to adjust the horizontal position of the blades 33.

The work is accurately guided after leaving the chains 14 by guide members, best seen in Fig. 3. Said guide members include a pair of angle irons 53 and 54 secured to the upper surface of the work table 10. The angle iron 54 has secured thereto a plate 55 by means of bolts 56 extending freely through the plate 54. A filling 57 of rubber or other resilient material is placed between the plate 55 and the angle iron 54 and is compressible to hold the work firmly against the angle iron 53. It will be apparent from Fig. 1 that the work, as it is discharged from the conveyor chains 14, is received between the plate 55 and the angle iron 53 and is accurately guided in contact with the member 53. From Fig. 2 it will be seen that the saws 33 extend upwardly through the work table 10 to engage the under surface of the work. At this point the stock is held down in contact with the work table by resilient pressure bars 58 which may be mounted on fixed rectangular shafts 59. Said shafts may be supported from the work table in any suitable manner but said supports are omitted from the drawings for the sake of clearness. In the region of the opening 22 in the work table there are provided stock supports 60 secured to the under surfaces of the angle members 53 and 54 respectively. Said stock supports support the corners of the stock 61 as best seen in Fig. 3 but are so placed as not to interfere with the saw blades 33.

Referring now to Fig. 2 there are provided a plurality of guide plates 62 which are secured to the work table 10 at 63 and secured by bolts 64 to a bracket 65. The guide plates 62 are preferably formed of the same thickness of material as the saw blades and so substantially fill the cuts made by the saws. Said guide plates engage the lower portions of the saw cuts from a point immediately behind the saw 33 through the area beneath the saw 50. They therefore guide the work accurately to the blades of the second saw. Beyond the second saw the guide plates extend also into the upper portions of the cuts.

Beyond the saw 50 the upper surface of the work is engaged by a hold-down roller 66, freely mounted on a shaft 67, supported in a vertically movable support 68 slidably mounted on a vertical dovetailed guide member 69. Said guide member is mounted on the work table 10 and the support 68 may be adjusted vertically by a screw 70 and crank handle 71 similar to those already described.

In the use of the invention the position of the saws 33 is adjusted so that they cut slightly more than half way through the work stock. The saws 50 are aligned laterally with the saws 33 by the micrometer screw 44 and the height of the saw is adjusted to finish the cuts made by the saws 33. The stock may then be fed between the chains 14 and is propelled thereby into contact with the saw blades. The use of upper and lower saws with accurate means for adjusting the same makes possible the use of saws having much smaller diameter and less thickness than is required when a single saw is used to make the complete cuts. Saws of relatively thin material can be accurately spaced and maintained accurately in position. At the same time the slats are turned out relatively free of saw marks and need but little further finishing.

The invention has been described in one of its preferred forms, the details of which may be varied by those skilled in the art without departing from the scope of the invention as defined by the appended claims.

The invention claimed is:

1. In a power rip saw, a stationary support, means for feeding work in a predetermined path while supported on said support, a rotary gang saw journaled beneath said path and having blades positioned to make a series of cuts in the under surface of said work, a vertical guide member mounted on said support, a base member mounted on said guide member and vertically movable, adjustable supporting means supporting said base member and retaining the same in adjusted position on said guide member, a shaft bearing supported on said base member and horizontally adjustable with respect thereto, a shaft journaled in said bearing, a second rotary gang saw mounted on said shaft in position to engage the upper surface of said work at a later point in the travel of said work than that engaged by said first mentioned gang saw and having blades of similar thickness and spacing, said second mentioned saw being vertically adjustable by said adjustable supporting means to complete said cuts, a micrometer movement for adjusting the horizontal position of said shaft bearing to align the blades of said second mentioned gang saw with those of said first mentioned gang saw, and a plurality of stationary guide plates having substantially the same thickness and spacing as the blades of said gang saws and engaging said cuts close to the position of said first mentioned saw and extending beneath the position of said second mentioned saw.

2. In a power rip saw, a stationary support, means for feeding work in a predetermined path while supported on said support, a rotary gang saw journaled beneath said path and having blades positioned to make a series of cuts in the under surface of said work, a vertical guide member mounted on said support, a base member mounted on said guide member and vertically movable, adjustable supporting means supporting said base member and retaining the same in adjusted position on said guide member, a shaft bearing supported on said base member and horizontally adjustable with respect thereto, a shaft journaled in said bearing, a second rotary gang saw mounted on said shaft in position to engage the upper surface of said work at a later point in the travel of said work than that engaged by said first mentioned gang saw and having blades of similar thickness and spacing, said second mentioned saw being vertically adjustable by said adjustable supporting means to complete said cuts, a micrometer movement for adjusting the horizontal position of said shaft bearing to align the blades of said second mentioned gang saw with those of said first mentioned gang saw, and a plurality of stationary guide plates having substantially the same thickness and spacing as the blades of said gang saws and engaging the lower portions of said cuts through a zone beginning close to said first mentioned saw and extending beneath said second mentioned saw and engaging both lower and upper portions of said cuts through a zone extending to the rear of said second mentioned saw.

ARTHUR J. CALPHA.
OSCAR I. CRAFT.